(12) United States Patent
Wookey

(10) Patent No.: US 8,997,172 B2
(45) Date of Patent: Mar. 31, 2015

(54) CONTROLLING INFORMATION DISCLOSURE DURING APPLICATION STREAMING AND PUBLISHING

(75) Inventor: Michael Wookey, Epping (AU)

(73) Assignee: Citrix Systems, Inc., Fort Lauderdale, FL (US)

( * ) Notice: Subject to any disclaimer, the term of this patent is extended or adjusted under 35 U.S.C. 154(b) by 198 days.

(21) Appl. No.: 13/285,362

(22) Filed: Oct. 31, 2011

(65) Prior Publication Data

US 2012/0117611 A1    May 10, 2012

Related U.S. Application Data

(60) Provisional application No. 61/411,106, filed on Nov. 8, 2010.

(51) Int. Cl.
*G06F 17/00* (2006.01)
*G06F 21/10* (2013.01)

(52) U.S. Cl.
CPC .................................... *G06F 21/10* (2013.01)
USPC .......................................................... 726/1

(58) Field of Classification Search
CPC ....................................................... G06F 21/10
USPC ............................................................. 726/1
See application file for complete search history.

(56) References Cited

U.S. PATENT DOCUMENTS

| | | | |
|---|---|---|---|
| 6,028,932 A * | 2/2000 | Park | 380/203 |
| 7,171,390 B1 * | 1/2007 | Song et al. | 705/52 |
| 2006/0053228 A1 * | 3/2006 | Rachman et al. | 709/231 |
| 2006/0235756 A1 * | 10/2006 | Pellegrino | 705/26 |
| 2008/0002939 A1 * | 1/2008 | Moteki | 386/46 |

FOREIGN PATENT DOCUMENTS

WO    WO 2006077490 A1 *    7/2006

* cited by examiner

*Primary Examiner* — Mohammad W Reza
(74) *Attorney, Agent, or Firm* — Banner & Witcoff, Ltd.

(57) ABSTRACT

Various aspects as described herein are directed to systems, method, apparatuses, and software for intercepting requests to copy content, paste content, clip content, cut content, or perform a print screen operation, and either allowing the requested operation to occur or preventing the operation depending upon whether the content is sourced from a streamed application or a non-streamed application, and/or depending upon a streamed application-based policy. This may be performed by, for instance, hooking an appropriate function call to the operating system.

16 Claims, 11 Drawing Sheets

CONTROLLING INFORMATION DISCLOSURE DURING APPLICATION STREAMING AND PUBLISHING

CROSS-REFERENCE TO RELATED APPLICATIONS

This application claims priority to, and is a non-provisional of, U.S. Provisional Patent Application Ser. No. 61/411,106, filed Nov. 8, 2010, entitled, "Preventing Information Disclosure During Application Streaming and Publishing," hereby incorporated by reference as to its entirety.

BACKGROUND

When information is streamed from one computer to another, there can be instances where information content is lost, such as when the user or a software application initiates a copy, cut, or paste operation on the content. In the case of hosted applications and locally-executing applications, policies are sometimes implemented to prevent the use these types of copying/pasting functions when they are not appropriate. However, it is believed that policies do not exist that specifically address the use of a clipboard in connection with content displayed by a streamed application that executes on a user's local desktop, as opposed to a non-streamed application or a hosted application. Furthermore, it is believed that there are currently no policies directed towards preventing screen capture of a screen specifically when it contains such streamed application content, even if the content is not protected by digital management rights (DRM).

SUMMARY

Various aspects as described herein are directed to systems, method, apparatuses, and software for intercepting requests to copy content, paste content, clip content, cut content, or perform a print screen operation, and either allowing the requested operation to occur or preventing the operation depending upon whether the content is sourced from a streamed application or a non-streamed application, and/or depending upon a policy. This may be performed by, for instance, hooking an appropriate function call to the operating system.

For example, some aspects are directed to a system, method, apparatus, or software for detecting, by a computing device, a request to obtain a copy of content displayed by a software application on a display of the computing device; determining, by the computing device, whether the software application is a streamed application; and selectively either copying or not copying, by the computing device, the content depending upon whether the application is determined to be a streamed application.

Further aspects are directed to, for example, a system, method, apparatus, or software for intercepting a request directed to a software application for digital rights management (DRM) status of content displayed by the software application executing on a computing device; determining, by the computing device, whether the software application is a streamed application; and depending upon whether the software application is determined to be a streamed application, either (1) allowing the software application to respond to the request with a DRM status of the content, or (2) responding to the request that the content is DRM protected.

Still further aspects are directed to, for example, a system, method, apparatus, or software for intercepting a request directed to the operating system to paste the copy of the content; responsive to the intercepted request to paste, determining whether the global variable contains the first value or the second value; and selectively either allowing the operating system to perform a paste operation or preventing the paste operation, depending upon whether the global variable contains the first value or the second value.

These and other aspects will be described in greater detail herein with reference to examples set forth in the various drawings.

BRIEF DESCRIPTION OF THE DRAWINGS

The following figures depict certain illustrative embodiments of the methods and systems described herein, in which like reference numerals refer to like elements. These depicted embodiments are to be understood as illustrative of the disclosed methods and systems and not as limiting in any way.

The following figures depict certain embodiments, in which like reference numerals refer to like elements. These depicted embodiments are to be understood as illustrative of the disclosure and not as limiting in any way.

DETAILED DESCRIPTION

In the following description of the various embodiments, reference is made to the accompanying drawings, which form a part hereof, and in which is shown by way of illustration various embodiments in which one or more aspects of the disclosure may be practiced. It is to be understood that other embodiments may be utilized and structural and functional modifications may be made without departing from the scope of the present disclosure.

Various connections between elements are discussed in the following description. These connections are general and, unless specified otherwise, may be direct and/or indirect, wired and/or wireless, and this specification is not intended to be limiting in this respect.

Figure 1A:
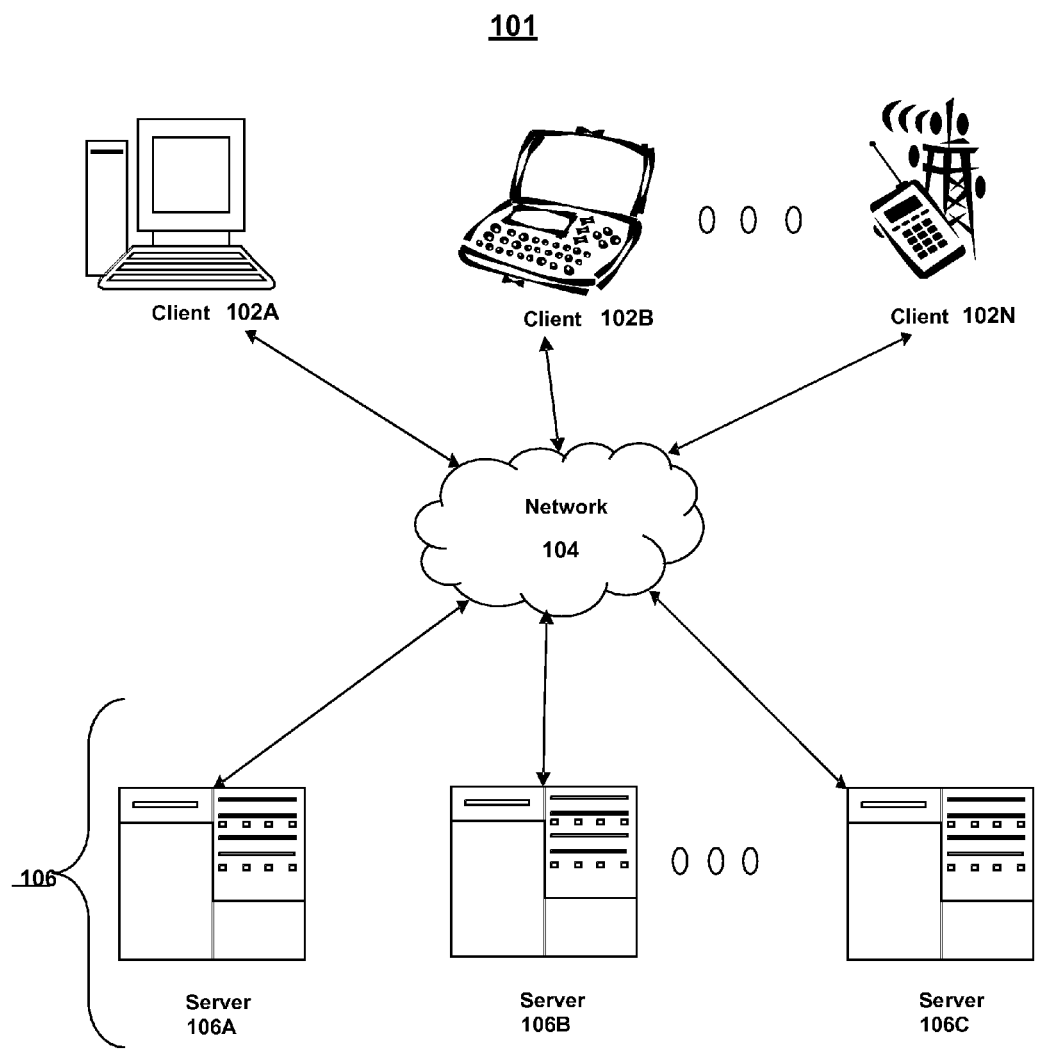
FIG. 1A illustrates an example computing environment in which various aspects of the disclosure may be implemented.

FIG. 1A illustrates an example computing environment 101 that may include one or more client machines 102A-102N (generally referred to herein as "client machine(s) 102") that may be in communication with one or more servers 106A-106N (generally referred to herein as "server(s) 106").

Installed in between the client machine(s) 102 and server(s) 106 may be one or more networks, such as a network 104.

The computing environment 101 may include one or more appliances installed between the server(s) 106 and client machine(s) 102. The appliance may mange client/server connections, and in some cases may load balance client connections amongst a plurality of backend servers.

The one or more client machines 102 may be a single client machine 102 or a group of client machines 102, while the one or more server(s) 106 may be a single server 106 or a group of servers 106. A given one of the client machines 102 may communicate with a single one of the servers 106 or with more than one of the servers 106. Likewise, a given one of the servers 106 may communicate with a single one of the client machines 102 or with more than one of the client machines 102. The client machine(s) 102 may referred to herein by any of the following terms: client machine(s) 102; client(s); client computer(s); client device(s); client computing device(s); local machine; remote machine(s); client node(s); endpoint(s); endpoint node(s); or a second machine(s). The server(s) 106 may be referred to herein by any of the following terms: server(s), local machine(s); remote machine; server farm(s), host computing device(s), or first machine(s).

Any of the client machines 102 may include a virtual machine, for example a virtual machine managed by a hypervisor developed by XenSolutions, Citrix Systems, IBM, VMware, or any other hypervisor. The virtual machine may be managed by, for example, a hypervisor executing on the server 106 or a hypervisor executing on the client machine 102.

The client machine(s) 102 may execute computer-executable instructions in the form of, e.g., a software application; a virtual machine; a hypervisor; a web browser; a web-based client; a client-server application; a thin-client computing client; an ActiveX control; a Java applet; software related to voice over internet protocol (VoIP) communications such as a soft IP telephone; an application for streaming video and/or audio; an application for facilitating real-time-data communications; an HTTP client; an FTP client; an Oscar client; a Telnet client; a streamed application; and/or any other set of executable instructions. The client machine(s) 102 may further display human-readable output generated by a software application remotely executing on a server 106 or other remotely located machine. In these embodiments, the client device 102 may display the application output in an application window, a browser, or other output window.

As used herein, a desktop may include a graphical environment or space in which one or more applications may be hosted and/or executed. A desktop may include a graphical shell providing a user interface for an instance of an operating system in which local and/or remote applications can be integrated. Applications, as used herein, include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device (e.g., the client machine(s) 102), or executed ("remoted") on a remotely located device such as server(s) 106).

The server(s) 106 may execute, for instance, a remote presentation client, or other client or program, that uses a thin-client or remote-display protocol to capture display output generated by an application executing on server(s) 106. Server(s) 106 may transmit the application display output to a remote client 102. The thin-client or remote-display protocol may include one or more of: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The server(s) 106 may be logically grouped together into a server farm, if desired. In such a case, some or all of the logically-grouped servers 106 in the server farm may be geographically dispersed or located proximate to each other. Geographically dispersed servers 106 within a server farm may communicate using, for instance, a WAN, MAN, or LAN. The servers 106 may be, e.g., on different continents, in different regions of a continent, in different countries, in different states, in different cities, on different campuses, and/or in different rooms. The server farm may be administered as a single entity or as a plurality of entities.

The server(s) 106 may each execute a substantially similar type of operating system platform (e.g., WINDOWS NT, manufactured by Microsoft Corp. of Redmond, Wash., UNIX, LINUX, or SNOW LEOPARD), or different types of operating systems. For instance, some of the servers 106 may execute a first type of operating system platform, and others of the servers 106 may execute a second type of operating system platform, where the first and second types of operating system platforms may be different platforms.

The server(s) 106 may be any server type(s), such as but not limited to: a file server; an application server; a web server; a proxy server; an appliance; a network appliance; a gateway; an application gateway; a gateway server; a virtualization server; a deployment server; an SSL VPN server; a firewall; a web server; an application server or as a master application server; a server executing an active directory; a server executing an application acceleration program that provides firewall functionality, application functionality, or load balancing functionality; and/or a RADIUS server that includes a remote authentication dial-in user service. Where one or more of the server(s) 106 may be or otherwise include an appliance, those one or more appliances may be an appliance manufactured by, for example, any one of the following manufacturers: the Citrix Application Networking Group; Silver Peak Systems, Inc; Riverbed Technology, Inc.; F5 Networks, Inc.; or Juniper Networks, Inc.

In operation, a first one of the servers 106 (e.g., server 106A) may receive a request from one of the client machines 102 and may forward that request to a second one of the servers 106 (e.g., server 106B). The second one of the servers 106 may then respond to the request. The first server may acquire an enumeration of applications available to the requesting client machine 102 and/or address information associated with one of the servers 106 that hosts an application identified within the enumeration of applications. The first server may then present a response to the client's request using a web interface, and communicate with the requesting client 102 to provide the requesting client 102 with access to the identified application. In doing so, the first server may, for instance, communicate directly with the requesting client 102 to provide the requesting client 102 with access to the identified application.

The server(s) 106 may execute one or more of the following applications, by way of example: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER or XenApp or XenDesktop; MICROSOFT WINDOWS Terminal Services manufactured by the Microsoft Corporation; or an ICA client, developed by Citrix Systems, Inc. In some embodiments, a server 106 may include an application server such as: an email server that provides email services such as MICROSOFT EXCHANGE manufactured by the Microsoft Corporation; a web or Internet server; a desktop sharing server; a collaboration server; or any other type of application server. In some embodiments, a server 106 may execute any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 may be or otherwise include, for example, a client node that seeks access to resources provided by one or more of the server(s) 106. The server(s) 106 may, for instance, provide client(s) 102 and/or client nodes with access to hosted resources. The server(s) 106 may function as a master node such that it communicates with one or more client(s) 102 and/or server(s) 106. The master node may identify and provide address information associated with one or more of the server(s) 106 hosting a requested application, to one or more of the client(s) 102 and/or server(s) 106. The master node may include, for instance, a server farm of a set of the servers 106, one or more of the client(s) 102, a cluster of the client nodes 102, and/or an appliance.

One or more of the client(s) 102 and/or one or more of the server(s) 106 may transmit data over the network 104 installed between machines and appliances within the computing environment 101. The network 104 may comprise one or more networks and/or sub-networks, and may be installed between any combination of the client(s) 102, server(s) 106, computing machines, and/or appliances included within the computing environment 101. The network 104 may be or otherwise include one or more of, for example: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; a primary private network 104 with a private sub-network 104; a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; and/or a network 104 that includes a wireless link where the wireless link may be an infrared channel or satellite band. The network topology of the network 104 may differ within different embodiments. The topology or topologies of the network 104 that may be utilized may include, for example: a bus network topology; a star network topology; a ring network topology; a repeater-based network topology; and/or a tiered-star network topology. The network 104 may further be or otherwise include mobile telephone networks that use a protocol to communicate among mobile devices, where the protocol may include one or more of the following, for example: AMPS; TDMA; CDMA; GSM; GPRS UMTS; and/or any other protocol able to transmit data among mobile devices.

Figure 1B:
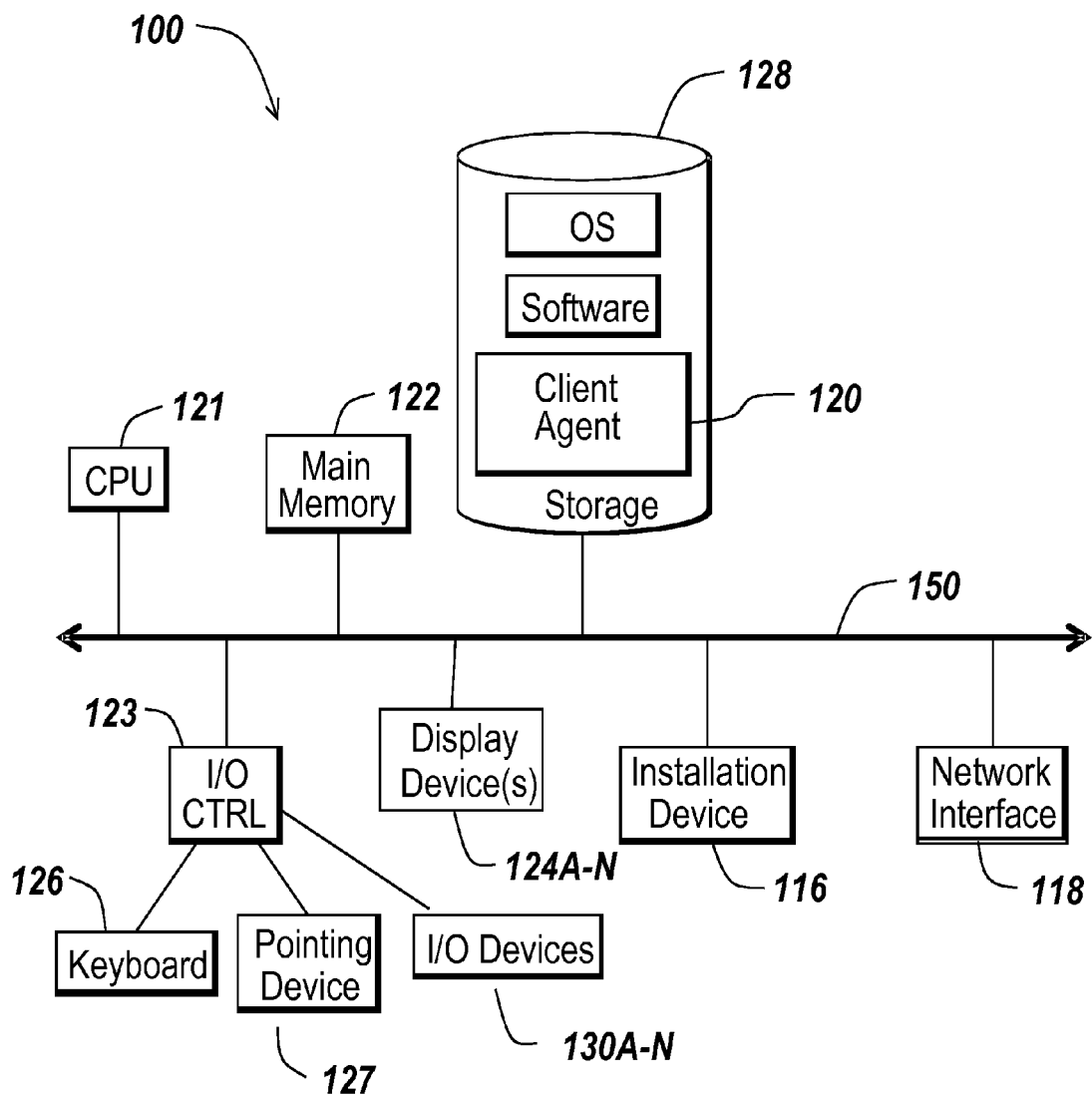
FIG. 1B and FIG. 1C illustrate example computing devices in which various aspects of the disclosure may be implemented.

FIG. 1B shows an example of a computing device 100 that may be used to partially or fully implement any of the client machine(s) 102, network 104, and/or server(s) 106 of FIG. 1A. In this example, the computing device 100 may include a system bus 150 that may communicate with one or more of the following components: a central processing unit 121; a main memory 122; a storage memory 128; an input/output (I/O) controller (CTRL) 123; display device(s) 124A-124N; an installation device 116; and/or a network interface 118.

The storage memory 128 may store data representing one or more of, for example: an operating system, software routines, a client agent 120, and/or non-executable data. The I/O controller 123 may, for instance, be connected or otherwise communicatively coupled to a user input device such as a keyboard 126 and/or a pointing device 127. I/O controller 123 may additionally or alternatively be connected or otherwise communicatively coupled to one or more other input/output devices 130A-130N. The computing device 100 may include firmware, hardware, and/or software to facilitate a determination of a location of computing device. For example, global positioning system (GPS) functionality may be provided by the computing device 100 to facilitate determining a location of the computing device 100.

Figure 1C:
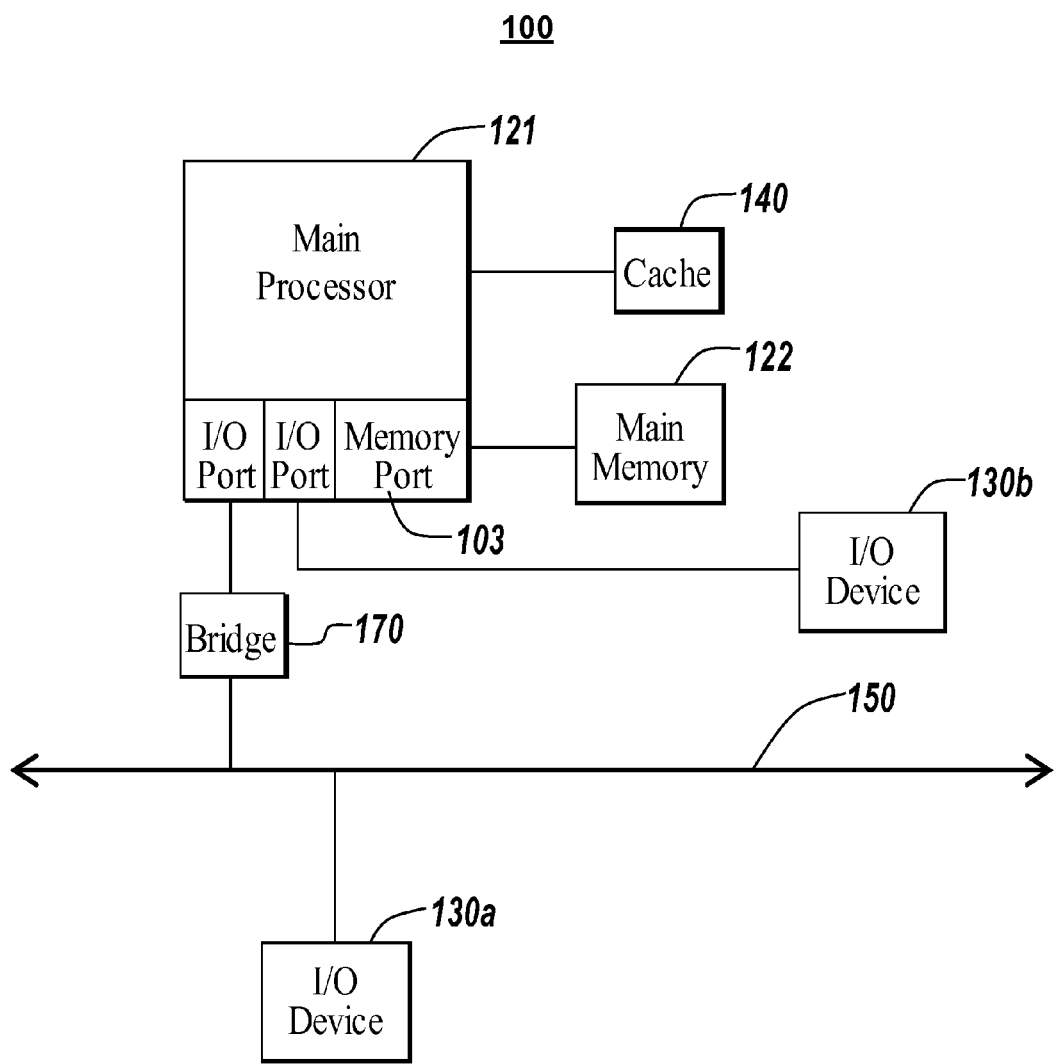

FIG. 1C illustrates another example embodiment of the computing device 100. This embodiment may also be used to partially or fully implement any of the client machine(s) 102, network 104, and/or server(s) 106 of FIG. 1A. In the example of FIG. 1C, the computing device 100 may include a system bus 150 that may communicate with one or more of the following components: a bridge 170 and/or a first I/O device 130A. The bridge 170 may be in communication with main processor 121, such as a central processing unit (CPU) or other type of processor. The main processor 121 may communicate with and/or include one or more of a second I/O device 130b, a main memory 122, and/or a cache memory 140. The main processor 121 may further include one or more I/O ports and/or a memory port 103 coupled to the main memory 122.

The main processor 121 may include one or more of the following component configurations, for example: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; and/or any other combination of logic circuits. The main processor 121 may be implemented as any one or more of the following, for example: a microprocessor, a microcontroller, a central processing unit with a single processing core, a central processing unit with two processing cores, and/or a central processing unit with more than one processing core. While FIG. 1C illustrates an example computing device 100 that includes a single main processor 121, in other embodiments the computing device 100 may include any number of a plurality of processors.

Regardless of how many processors are included, the computing device 100 may store or access executable firmware or other executable instructions that, when executed, direct one or more of the processors (e.g., main processor 121) to execute instructions that may be partially or fully stored in the main memory 122, the cache 140, and/or an I/O device 130a/130b such as a magnetic or optical drive. The executable instructions may apply to one or more pieces of data. In some embodiments, the instructions may execute simultaneously, or substantially simultaneously, on more than one of the processors (where multiple processor are provided). The computing device 100 may store or access executable firmware or other executable instructions that, when executed, direct the one or more processors to each execute a section of a group of instructions. For example, each processor may be instructed to execute a portion of a program or a particular module within a program.

In some embodiments, the main processor 121 (or each of multiple processors) may include one or more processing cores. For example, the main processor 121 may have two cores, four cores, eight cores, etc. Moreover, the main processor 121 (or each of multiple processors) may comprise one or more parallel processing cores. The processing cores may, for example, access available memory as a global address space. Memory within the computing device 100 may be segmented and assigned to a particular core within the main processor 121. One or more processing cores or processors in the computing device 100 may access local memory, and memory within the computing device 100 may be shared amongst one or more of the processors and/or processing cores, while other memory may be accessed by particular one of the processors or subsets of the processors. Where the computing device 100 includes more than one processor, the multiple processors may be packaged together as a single integrated circuit (IC). The multiple processors may be linked together by an internal high speed bus, which may be referred to as an element interconnect bus.

The one or more processors may execute a single instruction simultaneously on multiple pieces of data (SIMD). Where multiple processors are used, they may execute multiple instructions simultaneously on multiple pieces of data (MIMD). The computing device 100 may include any number of SIMD and/or MIMD processors, as desired.

The computing device 100 may further include, for example, a graphics processor and/or a graphics processing unit. The graphics processing unit may include any combination of firmware, software, and/or hardware. The graphics processing unit may input graphics data and/or graphics instructions, render a graphic from the inputted data and instructions, and/or output the rendered graphic. The graphics processing unit may be included within or outside the main processor 121, as desired. where the computing device 100 include multiple processors, at least one of the processors may be dedicated to processing and rendering graphics.

The main processor 121 may communicate with the cache memory 140 via, e.g., a secondary bus also known as a backside bus, and/or via the system bus 150. The system bus 150 may, in some embodiments, also be used by the processing unit to communicate with more than one type of I/O device 130*a*-130*n*. The system bus 150 may include one or more of the following types of buses, for example: a VESA VL bus; an ISA bus; an EISA bus; a MicroChannel Architecture (MCA) bus; a PCI bus; a PCI-X bus; a PCI-Express bus; and/or a NuBus. One or more of the I/O devices 130 may include a video display (e.g., a display device 124) that communicates with the main processor 121 via, for instance, one or more of the following connections: HyperTransport, Rapid I/O, and/or InfiniBand. In some embodiments, a first one of the I/O devices (e.g., I/O device 130*a*) may communicate with the main processor 121 using a local interconnect bus, while a second one of the I/O devices (e.g., I/O device 130*b*) may communicate with the main processor 121 using a direct connection via an I/O port of the main processor 121.

The main memory 122, the cache 140, and/or any other tangible and/or non-transitory computer-readable media may be embodied as one or more memories, such as static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); and/or any other type of memory. In some embodiments, processing unit 121 may access the main memory 122 via: the system bus 150; the memory port 103; and/or any other connection, bus, or port that allows the main processor 121 to access the respective memory or other storage device.

One or more installation devices 116 (see, e.g., FIG. 1B) may also be provided, such as the following types of installation devices: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or other types of software. An example of such an application may include a client agent 120 or any portion thereof The computing device 100 may include a storage device 128 for storing computer-readable information (executable instructions and/or non-executable data) that may include, e.g., one or more hard disk drives, optical drives, tape drives, memories, redundant arrays of independent disks, and/or any other one or more types of tangible and/or non-transitory computer-readable media. The storage device 128 may be configured to store an operating system, software, programs applications, data and/or at least a portion of the client agent 120. In some embodiments, the installation device 116 may be used as the storage device 128 and/or to supplement the storage device 128.

The computing device 100 may include a network interface 118 to interface to a network such as a Local Area Network (LAN), Wide Area Network (WAN), an intranet, and/or the Internet through any of a variety of connections including, but not limited to, standard telephone lines, LAN or WAN links (e.g., 802.11, T1, T3, 56k b, X.25, SNA, DECNET), broadband connections (e.g., ISDN, Frame Relay, ATM, Gigabit Ethernet, Ethernet-over-SONET), wireless connections, universal serial bus (USB) ports, Ethernet ports, and/or some combination of any or all of the above. Connections may also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). The network interface 118 may be able to communicate with one or more other computing devices via any type and/or form of gateway or tunneling protocol, such as Secure Socket Layer (SSL) or Transport Layer Security (TLS), or the Citrix Gateway Protocol manufactured by Citrix Systems, Inc. Versions of the network interface 118 may comprise one or more of: a built-in network adapter; a network interface card; a PCMCIA network card; a card bus network adapter; a wireless network adapter; a USB network adapter; a modem; or any other device suitable for interfacing the computing device 100 to a network capable of communicating and performing the various acts described herein.

In some embodiments, I/O devices 130A-130N may include one or more of: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the various acts described herein. An I/O controller 123 may, in some embodiments, connect to multiple I/O devices 130A-130N to control the one or more I/O devices. Some embodiments of the I/O devices 130A-130N may be configured to provide storage or an installation medium 116. In some embodiments, one or more of I/O devices 130A-130N may provide a USB interface for receiving USB storage devices such as the USB Flash Drive line of devices (e.g., those manufactured by Twintech Industry, Inc.) In some embodiments, an I/O device 130 may include or otherwise provide a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SO/LAMP bus; a FibreChannel bus; and/or a Serial Attached small computer system interface bus.

The computing device 100 may be configured to connect to one or more display devices 124A-124N that may all be the same type of display, or that may be of different types. Examples of the display devices 124A-124N that may be supported may include: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may be configured to use the one or more display devices 124A-124N, and these configurations may include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and/or executing software on the main computing device 100 and multiple secondary computing devices to enable the main computing device 100 to use a secondary computing device's display as a display device 124A-124N for the main computing device 100. In some embodiments, the computing device 100 may include multiple display devices 124A-124N provided by one or more secondary computing devices and connected to the main computing device 100 via a network.

The computing device 100 may execute any one or more operating systems, such as but not limited to: versions of the MICROSOFT WINDOWS operating systems such as WINDOWS 3.x, WINDOWS 95, WINDOWS 98, WINDOWS 2000, WINDOWS NT 3.51, WINDOWS NT 4.0, WINDOWS CE, WINDOWS XP, WINDOWS VISTA, and WINDOWS 7; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; and/or any other operating system. Where the computing device 100 executes multiple operating systems, the computing machine 100 may execute, for example, PARALLELS or another virtualization platform that may execute or manage a virtual machine executing a first operating system, while the computing machine 100 may execute a second operating system different from the first operating system.

The computing device 100 may be embodied, for example, in one or more of the following devices: a computing workstation; a desktop computer; a laptop or notebook computer; a server; a handheld computer such as a tablet computer; a mobile telephone; a portable telecommunication device; a media playing device; a gaming system; a mobile computing device; a netbook; a device of the IPOD, IPHONE, or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the acts described herein. In some embodiments the computing machine 100 may include a mobile device, such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device configured to perform the acts described herein. In still other embodiments, the computing device 100 may include any one of the following devices: any one series of Blackberry, or other handheld device manufactured by Research In Motion Limited; the iPhone manufactured by Apple Computer; Palm Pre; a Pocket PC; a Pocket PC Phone; or any other handheld mobile device.

The computing device 100 may, as desired, have multiple different processors, operating systems, and/or input/output devices. For example, the computing device 100 may be embodied as a TREO 180, 270, 600, 650, 680, 700p, 700w, or 750 smart phone manufactured by Palm, Inc. In some embodiments, the TREO smart phone may be operated under the control of the PalmOS operating system and may include a stylus input device as well as a five-way navigator device.

In some embodiments, the computing device 100 may be or otherwise include a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 may include a mobile device manufactured by Nokia of Finland, or by Sony Ericsson Mobile Communications AB of Lund, Sweden.

In some embodiments, the computing device 100 may be or otherwise include a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In some embodiments, the computing device 100 may include a smart phone, Pocket PC, Pocket PC Phone, or other handheld mobile device supporting Microsoft Windows Mobile Software. Moreover, the computing device 100 may include any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 may be or otherwise include a digital audio player, such as the Apple IPOD, IPOD Touch, IPOD NANO, and IPOD SHUFFLE lines of devices, manufactured by Apple Computer of Cupertino, Calif. In some embodiments, the digital audio player may function as both a portable media player and as a mass storage device. In some embodiments, the computing device 100 may include a digital audio player, such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In some embodiments, the computing device 100 may include a portable media player, such as the Zen Vision W, the Zen Vision series, the Zen Portable Media Center devices, or the Digital MP3 line of MP3 players, manufactured by Creative Technologies Ltd. In some embodiments, the computing device 100 may include a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 may comprise a combination of devices, such as a mobile phone combined with a digital audio player or portable media player. In some embodiments, the computing device 100 may include a Motorola RAZR or Motorola ROKR line of combination digital audio players and mobile phones. In some embodiments, the computing device 100 may include an iPhone smartphone, manufactured by Apple Computer of Cupertino, Calif.

Figure 2A:
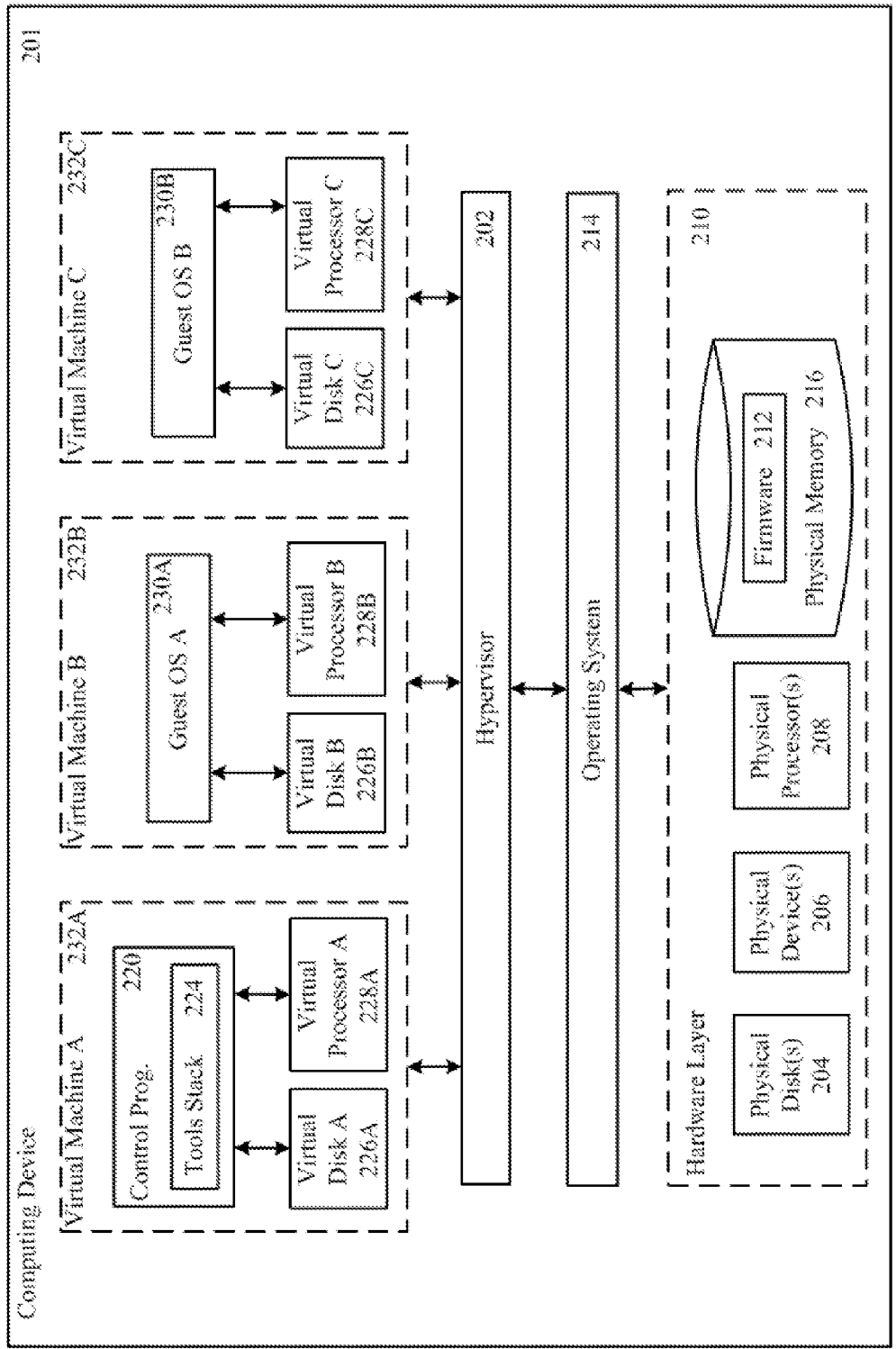
FIGS. 2A and 2B are block diagrams that depict example embodiments of a virtualization environment.

FIG. 2A is a block diagram showing an example embodiment of a virtualization environment. In this example, a computing device 201 may include a hardware layer that can include one or more physical disks 204, one or more physical devices 206, one or more physical processors 208, and/or a physical memory 216. In some embodiments, firmware 212 can be stored within a memory element in the physical memory 216 and can be executed by one or more of the physical processors 208. The computing device 201 can further include an operating system 214 that can be stored in a memory element in the physical memory 216 and executed by one or more of the physical processors 208. A hypervisor 202 can be stored in a memory element in the physical memory 216 and can be executed by one or more of the physical processors 208. One or more virtual machines 232A-C (generally 232) may execute on one or more of the physical processors 208. Each virtual machine 232 can have a virtual disk 226A-C and a virtual processor 228A-C, as desired. In some embodiments, a first virtual machine 232A can execute, on a virtual processor 228A, a control program 220 that includes a tools stack 224. In other embodiments, one or more virtual machines 232B-C can executed, on a virtual processor 228B-C, a guest operating system 230A-B.

The virtualization environment described may include, for example, a Type 2 hypervisor 202, and/or a hypervisor that executes within an operating system 214 executing on the computing device 201. A Type 2 hypervisor, in some embodiments, may execute within an operating system 214 environment and virtual machines may execute at a level above the hypervisor. In various embodiments, the Type 2 hypervisor may execute within the context of a user's operating system such that the Type 2 hypervisor interacts with the user's operating system.

In some embodiments, the virtualization environment may include a computing device 201. The computing device 201 can be any computing device, and in some embodiments, the computing device 201 can be any computer, device or computing machine described herein. While FIG. 2A illustrates by way of example a single computing device 201, in some embodiments the modules, programs, virtual machines, and commands stored and executed by the computing device 201 can be executed by more than one computing device 201. In still other embodiments, the computing device 201 can be a server farm.

In some embodiments, the computing device 201 can include a hardware layer 210 that includes one or more pieces of hardware that communicates with the computing machine 201. In some embodiments, the hardware layer 210 can include any hardware included in the computing device 201. In some embodiments, the hardware layer 210 can include one or more physical disks 204, one or more physical devices 206, one or more physical processors 208 and memory 216.

The hardware layer 210, in some embodiments, can include one or more physical disks 204. A physical disk 204 can be any hard disk, while in some embodiments a physical disk 204 can be any hard disk described herein. In some embodiments, the hardware layer 210 can include one physical disk 204. In some embodiments, the hardware layer 210 can include more than one physical disk 204. The computing device 201, in some embodiments, can communicate with an external hard disk that is included in the hardware layer 210 as a physical disk 204.

In some embodiments, the hardware layer 210 can include a processor 208. The processor 208, in some embodiments, can be any processor. The processor 208 can include one or more processing cores. In other embodiments the computing device 201 can include one or more processors 208. In some embodiments, the computing device 201 can include one or more different processors, e.g. a processing unit, a graphics processing unit, or a physics engine.

Physical devices 206, in some embodiments, can be any device included in the computing device 201. In some embodiments, physical devices 206 can be any combination of devices included in the computing device 201 and external devices that communicate with the computing device 201. The computing device 201, in some embodiments, can include one or more physical devices 206. A physical device 206 can be or otherwise include any of the following, for example: a network interface card; a video card; a keyboard; a mouse; an input device; a monitor; a display device; speakers; an optical drive; a storage device; a universal serial bus connection; any device connected to the computing device 201; any device communicating with the computing device 201; a printer; a scanner; and/or any other device or device described herein.

The hardware layer 210 can further include physical memory 216 that can include any type of memory. In some embodiments, the physical memory 216 can include any memory type described herein. The physical memory 216 can store data, and in some embodiments can store one or more programs, or set of executable instructions. FIG. 2A illustrates one embodiment where firmware 212 is stored within the physical memory 216 of the computing device 201. Programs or executable instructions stored in the physical memory 216 can be executed by the one or more processors 208 of the computing device 201.

Firmware 212, in some embodiments, can be any combination of executable instructions and hardware that controls hardware communicating with or included within the computing device 201. In some embodiments, the firmware 212 can control one or more pieces of hardware within the hardware layer 210. Firmware 212, in various embodiments, can be executed by one or more processors 208 within the computing device 201. In some embodiments, the firmware 212 can be boot firmware such as the basic input/output system (BIOS.) Additional firmware 212 executing on the computing device 201 can interface with the BIOS.

In some embodiments, the computing device 201 can include an operating system 214 executed by one or more physical processors 208. In some embodiments, the operating system 214 is a user operating system that can directly access the hardware devices in the hardware layer 210. The operating system 214 can be any operating system and in some embodiments, the operating system 214 can be any operating system described herein. FIG. 2A illustrates one example embodiment where the hypervisor 202 executes within the context of the operating system 214 executing on the computing device 201. In this particular embodiment, the operating system 214 can be referred to as a host operating system 214, while the other operating systems in the example may be referred to as guest operating systems. Guest operating systems can include, e.g., the guest operating systems 230A-B executing on the virtual machines 232, and/or the control program 220.

In some embodiments, the computing device 201 can include a hypervisor 202. A hypervisor 202, in some embodiments, can be a program that is executed by processors 208 on the computing device 201 to manage any number of virtual machines. The hypervisor 202 can be referred to as a virtual machine monitor, or platform virtualization software. In some embodiments, a hypervisor 202 can be any combination of executable instructions and hardware that monitors virtual machines executing on a computing machine. While FIG. 2A illustrates a virtualization environment that includes a Type 2 hypervisor 202, the computing device 201 can execute any other type of hypervisor. For example, the computing device 201 can execute a virtualization environment that includes a Type 1 hypervisor 202.

In some embodiments, the computing device 201 can execute one or more hypervisors 202. These one or more hypervisors 202 can be the same type of hypervisor or a different hypervisor type, as desired.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices; physical disks; physical processors; physical memory 216 and any other component included in the computing device 201 hardware layer 210. In these embodiments, the hypervisor 202 may be used to emulate virtual hardware, partition physical hardware, virtualize physical hardware, or execute virtual machines that provide access to computing environments.

In some embodiments, the hypervisor 202 may control processor scheduling and memory partitioning for a virtual machine 232 executing on the computing device 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 201 executes a hypervisor 202 that creates a virtual machine platform on which guest operating systems may execute. In these example embodiments, the computing device 201 can be referred to as a host server. An example of such a computing device is the XEN SERVER provided by Citrix Systems, Inc., of Fort Lauderdale, Fla.

In some embodiments, the hypervisor 202 can create a virtual machine 232A-B (generally 232) in which an operating system 230 executes. In one of these embodiments, for example, the hypervisor 202 loads a virtual machine image to create a virtual machine 232. In another of these embodiments, the hypervisor 202 executes an operating system 230 within the virtual machine 232. In still others of these embodiments, the virtual machine 232 may execute an operating system 230.

In some embodiments, the hypervisor 202 controls the execution of at least one virtual machine 232. In further embodiments, the hypervisor 202 presents at least one virtual machine 232 with an abstraction of at least one hardware resource provided by the computing device 201. The abstraction can further be referred to as a virtualization or virtual view of the hardware, memory processor and other system resources available on the computing device 201. Hardware or hardware resources, in some embodiments, can be any hardware resource available within the hardware layer 210. In some embodiments, the hypervisor 202 controls the manner in which virtual machines 232 access the physical processors 208 available in the computing device 201. Controlling access to the physical processors 208 can include determining whether a virtual machine 232 should have access to a processor 208, and how physical processor capabilities are presented to the virtual machine 232.

In some embodiments, the computing device 201 can host or execute one or more virtual machines 232. A virtual machine 232 can be called a domain, a guest and/or a DOMAIN U. A virtual machine 232 may include a set of executable instructions that, when executed by a processor 208, may imitate the operation of a physical computer such that the virtual machine 232 can execute programs and processes much like a physical computing device. While FIG. 2A illustrates an embodiment where a computing device 201 hosts three virtual machines 232, in other embodiments the computing device 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. The hypervisor 202, in some embodiments, provides each virtual machine 232 with a substantially similar virtual view of the physical hardware, memory, processor and other system resources available to the virtual machines 232.

Each virtual machine 232 may include a virtual disk 226A-C (generally 226) and a virtual processor 228A-C (generally 228.) The virtual disk 226, in some embodiments, is a virtualized view of one or more physical disks 204 of the computing device 201, or a portion of one or more physical disks 204 of the computing device 201. The virtualized view of the physical disks 204 can be generated, provided and managed by the hypervisor 202. In some embodiments, the hypervisor 202 provides each virtual machine 232 with a unique view of the physical disks 204. Thus, in these example embodiments, the virtual disk 226 included in each virtual machine 232 can be unique when compared with the other virtual disks 226.

A virtual processor 228 may be a virtualized view of one or more physical processors 208 of the computing device 201. In some embodiments, the virtualized view of the physical processors 208 can be generated, provided and managed by the hypervisor 202. In some embodiments, the virtual processor 228 has substantially all of the same characteristics of at least one physical processor 208. In some embodiments, the virtual processor 208 provides a modified view of the physical processors 208 such that at least some of the characteristics of the virtual processor 228 are different than the characteristics of the corresponding physical processor 208.

A control program 220 may execute at least one application for managing and configuring the guest operating systems executing on the virtual machines 232 and in some embodiments the computing device 201. In some embodiments, the control program 220 can be called a control operating system, a control domain, domain 0 or dom 0. The control program 220, in some embodiments, can be DOMAIN o or DOM0 of the XEN hypervisor. The control program 220 can execute an administrative application or program that can further display a user interface which administrators can use to access the functionality of each virtual machine 232 and/or to manage the virtual machines 232. In some embodiments, the user interface generated by the administrative program can be used to terminate the execution of virtual machines 232, allocate resources to virtual machines 232, assign permissions to virtual machines 232, or manage security credentials associated with virtual machines 232. The control program 220, in some embodiments, can start new virtual machines 232 or terminate execution of executing virtual machines 232. In some embodiments, the control program 220 can directly access hardware and/or resources within the hardware layer 210. In still another embodiment, the control program 220 can interface with programs and applications executing on the computing device 210 and outside of the context of a virtual machine 232. Similarly, the control program 220 can interface with programs and applications executing within the context of a virtual machine 232.

In some embodiments, the hypervisor 202 can execute the control program 220 within a virtual machine 232. The hypervisor 202 can create and start the virtual machine 232. In embodiments where the hypervisor 202 executes the control program 220 within a virtual machine 232, that virtual machine 232 can be referred to as the control virtual machine 232. In some embodiments, the control program 220 executes within a virtual machine 232 that is authorized to directly access physical resources on the computing device 201.

In some embodiments, a control program 220 on a first computing device 201 may exchange data with a control program 220B on a second different computing device 201. In these embodiments, the first computing device 201A may be located physically remote from the second computing device 201B. The control programs 220A-B may exchange data via a communication link between a hypervisor 202 executing on the first computing device 201 and a hypervisor 202 executing on the second computing device 201. Through this communication link, the two computing devices 201 may be able to exchange data regarding processors and other physical resources available in a pool of resources. Further, through this connection between the two hypervisors 202, the hypervisors 202 may be able to manage a pool of resources, e.g. the resources available on the first computing device 201 and the second computing device 201, distributed across one or more of the computing devices 201. The hypervisors 202 can further virtualize these resources and make them available to virtual machines 232 executing on the computing devices 201. In another instance of this embodiment, a single hypervisor 202 can manage and control virtual machines 232 executing on both computing devices 201.

In some embodiments, the control program 220 interacts with one or more guest operating systems 230A-B (generally 230.) The control program 220 can communicate with the guest operating systems 230 through a hypervisor 202. Through the hypervisor 202, the guest operating system 230 can request access to physical disks 204, physical processors 208, memory 216, physical devices 206 and any other component in the hardware layer 210. In some embodiments, the guest operating systems 230 can communicate with the control program 220 via a communication channel established by the hypervisor 202, such as, for example, via a plurality of shared memory pages made available by the hypervisor 202.

In some embodiments, the control program 220 includes a network back-end driver for communicating directly with networking hardware provided by the computing device 201. In some of these embodiments, the network back-end driver processes at least one virtual machine request from at least one guest operating system 230. In further embodiments, the control program 220 includes a block back-end driver for communicating with a storage element on the computing device 201. In some of these embodiments, the block back-end driver reads and writes data from the storage element based upon at least one request received from a guest operating system 230.

In some embodiments, the control program 220 includes a tools stack 224. In some embodiments, a tools stack 224 provides functionality for interacting with the hypervisor 202, communicating with other control programs 220 (for example, on a second computing device 201B), or managing virtual machines 232 on the computing device 201. In some embodiments, the tools stack 224 includes customized applications for providing improved management functionality to an administrator of a virtual machine farm. In some embodiments, at least one of the tools stack 224 and the control program 220 include a management API that provides an interface for remotely configuring and controlling virtual machines 232 running on a computing device 201. In some embodiments, the control program 220 communicates with the hypervisor 202 through the tools stack 224.

In some embodiments, the hypervisor 202 executes a guest operating system 230 within a virtual machine 232 created by the hypervisor 202. In some embodiments, the guest operating system 230 provides a user of the computing device 201 with access to resources within a computing environment. In some embodiments, a resource may include a program, an application, a document, a file, a plurality of applications, a plurality of files, an executable program file, a desktop environment, a computing environment, and/or other resource made available to a user of the computing device 201. In yet further embodiments, the resource may be delivered to the computing device 201 via a plurality of access methods including, but not limited to, conventional installation directly on the computing device 201, delivery to the computing device 201 via a method for application streaming, delivery to the computing device 201 of output data generated by an execution of the resource on a second computing device 201' and communicated to the computing device 201 via a presentation layer protocol, delivery to the computing device 201 of output data generated by an execution of the resource via a virtual machine executing on a second computing device 201', or execution from a removable storage device connected to the computing device 201, such as a USB device, or via a virtual machine executing on the computing device 201 and generating output data. In some embodiments, the computing device 201 transmits output data generated by the execution of the resource to another computing device 201'.

In some embodiments, the guest operating system 230, in conjunction with the virtual machine on which it executes, forms a fully-virtualized virtual machine that is not aware that it is a virtual machine; such a machine may be referred to as a "Domain U HVM (Hardware Virtual Machine) virtual machine". In some embodiments, a fully-virtualized machine includes software emulating a Basic Input/Output System (BIOS) in order to execute an operating system within the fully-virtualized machine. In still further embodiments, a fully-virtualized machine may include a driver that provides functionality by communicating with the hypervisor 202. In such example embodiments, the driver may be typically aware that it executes within a virtualized environment.

In some embodiments, the guest operating system 230, in conjunction with the virtual machine on which it executes, forms a para-virtualized virtual machine, which is aware that it is a virtual machine; such a machine may be referred to as a "Domain U PV virtual machine". In another embodiment, a para-virtualized machine includes additional drivers that a fully-virtualized machine does not include. In some embodiments, the para-virtualized machine includes the network back-end driver and the block back-end driver included in a control program 220, as described above.

Figure 2B:
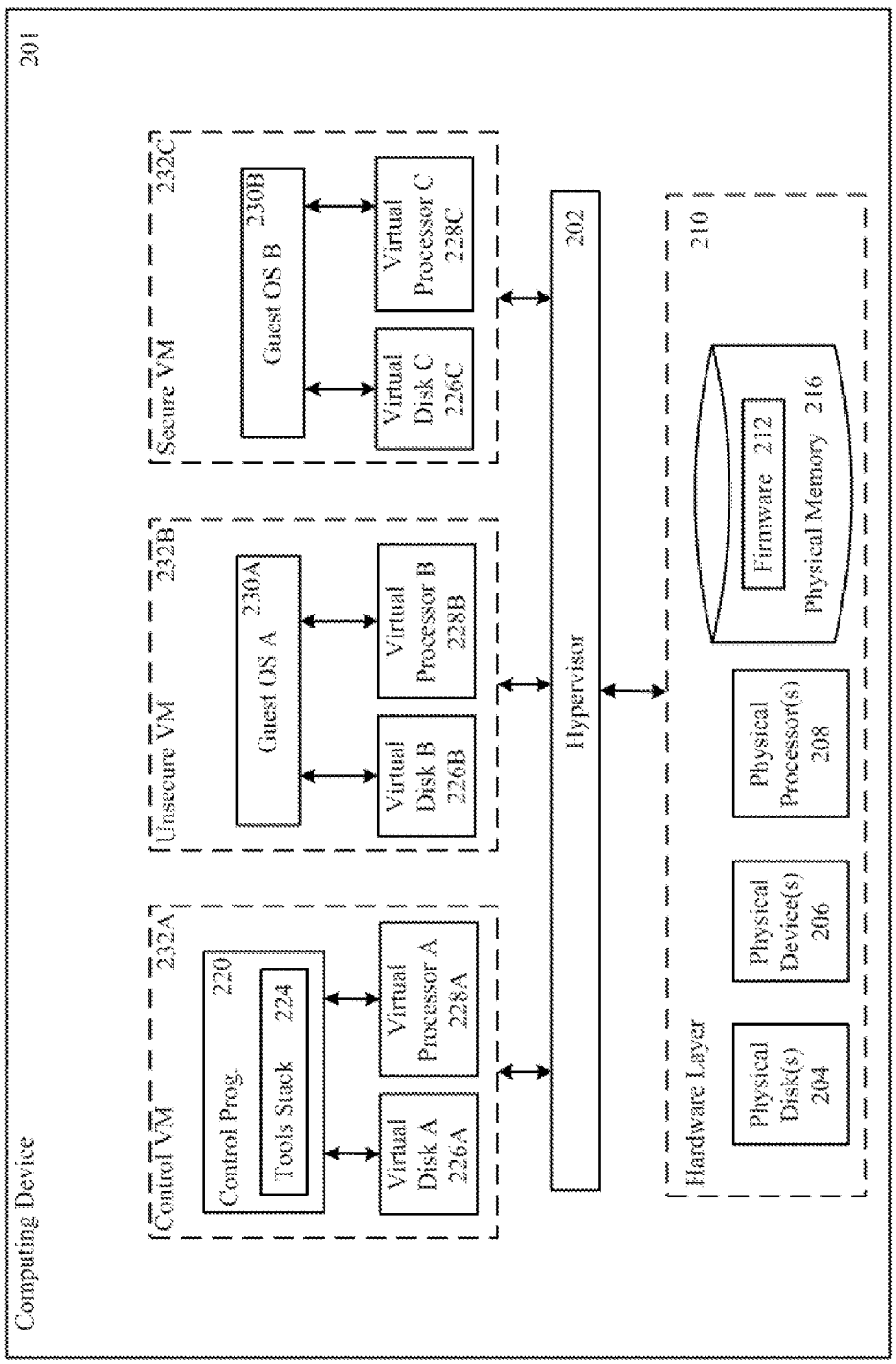

FIG. 2B is a block diagram of another example embodiment of a virtualization environment that includes a Type 1 hypervisor 202 executing on the computing device 201 that may be able to directly access the hardware and resources within the hardware layer 210. Virtual machines 232 managed by the hypervisor 202 can be an unsecure virtual machine 232B and/or a secure virtual machine 232C. Whereas the example virtualization environment depicted in FIG. 2A illustrates a host operating system 214, the virtualization environment embodiment in the example of FIG. 2B does not execute a host operating system.

The example virtualization environment of FIG. 2B includes a Type 1 hypervisor 202. Type 1 hypervisors 202, in some embodiments, execute on "bare metal," such that the hypervisor 202 has direct access to all applications and processes executing on the computing device 201, all resources on the computing device 201 and all hardware on the computing device 201 or communicating with the computing device 201. While a Type 2 hypervisor 202 may access system resources through a host operating system 214, a Type 1 hypervisor 202 may directly access all system resources. The Type 1 hypervisor 202 may be able to execute directly on one or more physical processors of the computing device 201, and can include program data stored in the physical memory 216.

In a virtualization environment that employs a Type 1 hypervisor 202 configuration, the host operating system may be executed by one or more virtual machines 232. Thus, a user of the computing device 201 may be able to designate one or more virtual machines 232 as the user's personal machine. This virtual machine can imitate the host operating system by allowing a user to interact with the computing device 201 in substantially the same manner that the user would interact with the computing device 201 via a host operating system 214.

Virtual machines 232 can be unsecure virtual machines 232B and secure virtual machine 232C. While FIG. 2B illustrates a secure and unsecure virtual machine, sometimes they can be referred to as privileged and unprivileged virtual machines. In some embodiments, a virtual machine's security can be determined based on a comparison of the virtual machine to other virtual machines executing within the same virtualization environment. For example, were a first virtual machine to have access to a pool of resources, and a second virtual machine not to have access to the same pool of resources; the second virtual machine could be considered an unsecure virtual machine 232B while the first virtual machine could be considered a secure virtual machine 232A. In some embodiments, the ability of a virtual machine 323 to access one or more system resources may be configured using a configuration interface generated by either the control program 220 or the hypervisor 202. In some embodiments, the level of access afforded to a virtual machine 232 can be the result of a review of any of the following sets of criteria: the user accessing the virtual machine; one or more applications executing on the virtual machine; the virtual machine identifier; a risk level assigned to the virtual machine based on one or more factors; or any other similar criteria.

In some embodiments, unsecure virtual machines 232B may be prevented from accessing resources, hardware, memory locations, and programs that secure virtual machines 232A may access. For example, a secure virtual machine 232C may be able to access one or more company resources, while the unsecure virtual machine 232B cannot access any company resources.

As will be discussed in connection with various example embodiments, a computing device, such as one of the client devices 102, may be configured to selectively allow or block attempts to make copies of contents displayed by applications executing on the computing device, depending upon whether the content is being displayed by a streamed or non-streamed software application that is executing on the computing device, and further based on predetermined policy. Attempts to make copies may include, for example, invoking a copy command, a cut command, a paste command, a print screen command, a snip tool command, and/or any other command or tool configured to obtain content from a source (such as a displayed window or displayed screen portion) and/or to generate a copy of the obtained content such as at a location different than the source from which the content was obtained. As will be seen, where the source is a streamed application, the computing device may be configured to selectively allow or block attempts to make copies based on predetermined policy.

A streamed application, as used herein, refers to an application that may be provided by a first computing device (e.g., a server such as one or more of the server(s) 106) and partially or fully sent to a local client device (e.g., one or more client device(s) 102) for local execution at the client device. This is distinguishable from a hosted application, in which the application is executing on the server rather than the client device (even though thin-client-based interaction with the application may be performed remotely by the client device). A streamed application may be packaged in such a way that the streamed application can be locally delivered to and executed at the client device within a virtualization environment such as a "sandbox." The virtualization environment may provide a set of resources for the streamed application to use, such as described by way of example with reference to FIGS. 2A and 2B. The virtualization environment may be implemented by a locally-executed client application that may also be provided by the server or from another location. Citrix Systems Inc. of Ft. Lauderdale, Fla., for example, provides a XenApp® on-demand application delivery product in which client software called Citrix Receiver® provides the virtualization environment at the client device.

Streamed applications can be a useful way to allow a client device to implement the functionality of the application without necessarily locally storing the entire application. For instance, in some cases, only a portion of a streamed application might be initially downloaded from the server to the client device, that initial portion typically providing the most commonly used functionality. For example, where the streamed application is a word processor application, the initial portion may provide functionality for basic text entry, editing, and saving functions, but not necessary functionality for advanced functions such as equation editing or advanced publishing capabilities. If such additional functions are requested by the user of the client device, those additional functions might then be requested from the server in real time and downloaded to the client device.

In many cases, for a given application such as a word processor application or a spreadsheet application, the essential application may be nearly the same to the user regardless of whether or not the application is a streamed application. Therefore, it may be difficult for the client device to know whether a given application executing on the client device is a streamed application or a non-streamed application. However, there may be one or more detectable differences between streamed and non-streamed applications. For instance, the client-side virtualization environment in which a streamed application executes may include or invoke one or more specialized components to interact with the operating system. Also, where the streamed applications are pre-packaged at the server side in preparation for streaming, the packaging process itself may involve modifications to the applications themselves, such as adding, modifying, and/or removing components of the application. Therefore it may be expected that one or more components would be executing or otherwise referred to by a streamed application that would not normally be executing or otherwise referred to by a non-streamed application. By way of example, in the case of the XenApp® on-demand application delivery product provided by Citrix Systems, Inc., a client-installed library named radehook.dll is used by streamed applications, but typically not by non-streamed applications. Therefore, one way that the client computing device may determine whether a currently-running application is a streamed application is to determine whether the radehook.dll (or any other appropriate component used by a streamed application but not a non-streamed application) is executing or otherwise active (e.g., referenced by the streamed application).

Other ways to detect whether a currently-running application is a streamed application may also be implemented. For example, a global list of streamed applications may be maintained at the client device, such as by a kernel device driver. The process identifier of a streamed application may be maintained in the device driver (e.g., in the case of Citrix XenAPP® on-demand application delivery, this might be in the device driver ctxpidmon.sys). Thus, to determine whether an application is streamed or not, the application may be queried, such as by hook software as described further below, for the current process identifier for that application. Then, the kernel device driver may be queried (again, by the hook) to determine whether he current process identifier identified by the application is one that is also being tracked by the kernel device driver. If there is a match, then the application would be considered a streamed application. If not, then the application would be considered a non-streamed application.

Now that the client device can detect whether an application is a streamed application, the client device may be able to use this information to control various functions at the client device. For example, the client device may be able to control whether a copy can be made of content displayed by a streamed application. Depending upon the operating system, there may be various ways that a user or a piece of software can attempt to make a copy of such content. Most operating systems provide basic cut, copy, and paste tools, as well as screen capture tools. For example, various versions of Microsoft Windows® operating systems provide, in addition to cut, copy, and paste functions, a Snipping Tool that allows a user to capture a copy of an object or other user-selected portion of the screen. Apple Computer also provides, in various versions of its computer and mobile operating systems (e.g., Tiger, Lion, OS 4, OS 5) cut, copy, and paste functions in addition to various other similar tools. In many computers, a Print Screen (or other similarly named) button or keyboard-shortcut function may be provided to allow a user to easily invoke a screen capture function.

Regardless of the particular content copying tool used, it may be desirable to control such copying of content (and/or the use of the copied content) based on whether the application from which the content is copied is a streamed application and/or based on other policies. For example, this may be accomplished by providing a piece of software, referred to herein as a software hook, that may execute in the background looking for key events indicating an attempt to copy, paste, and/or otherwise making a copy (or utilizing that copy) of content displayed by an application. The software hook may do this by, for instance, managing the appropriate application programming interfaces (APIs) for getting and/or setting clipboard data. The software hook may be implemented by, for instance, the virtualization environment running locally on the client device. Various examples of how such content copying control might be performed are discussed next with regard to FIGS. 3-7.

Figure 3:
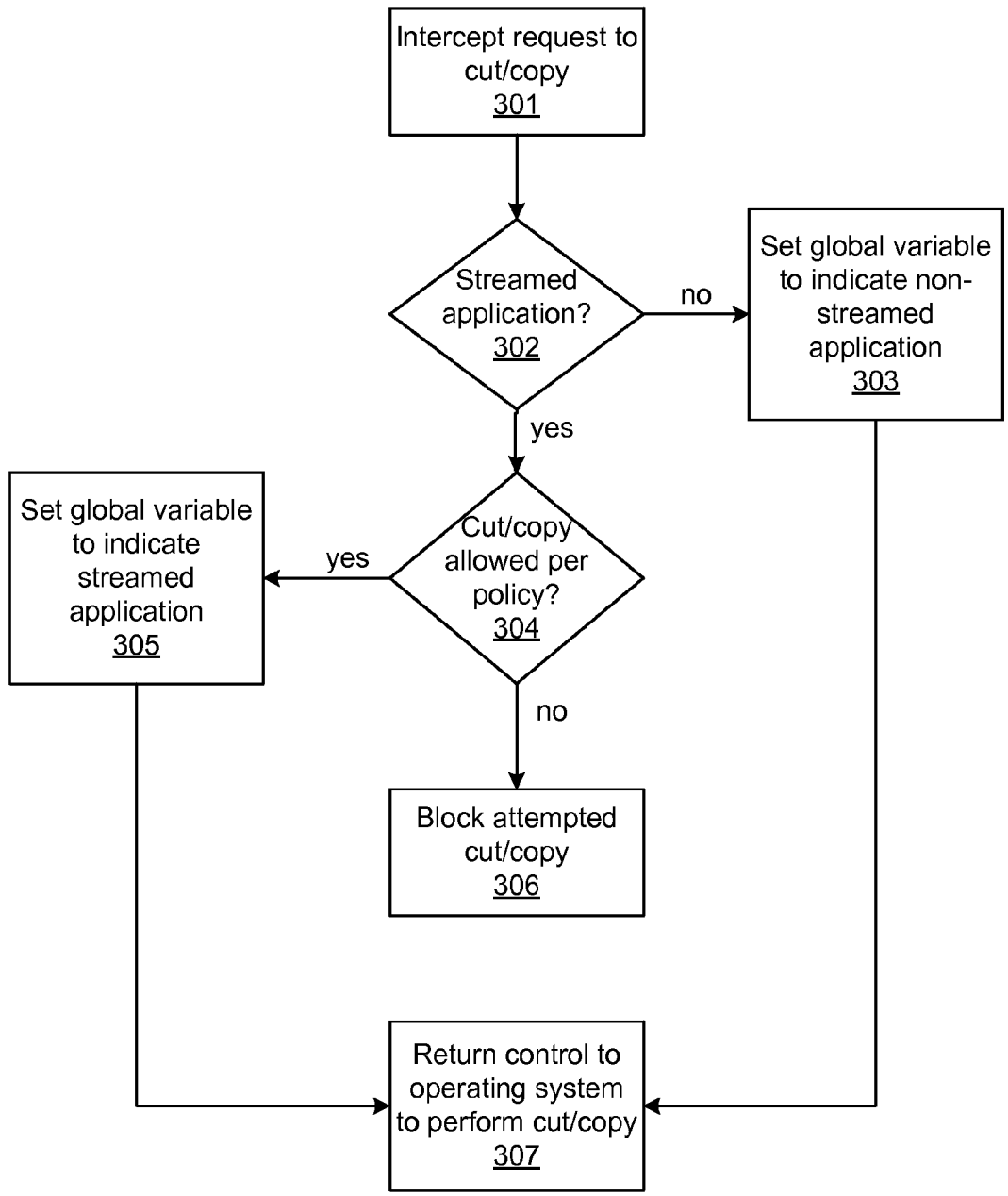
FIG. 3 is a flow chart showing an example method of controlling whether a cut or copy command on a client device may be successfully performed.

FIG. 3 is a flow chart showing an example method of controlling whether a cut or copy command on a client device (e.g., client device 102) may be successfully performed. At step 301, a software hook running on the client device may intercept a request to cut or copy content displayed on the screen (e.g., of display device 124) by an application executing on the client device. For instance, the software hook may be or otherwise include a routine that continuously operates in the background, looking for a cut or copy command.

Figure 7:
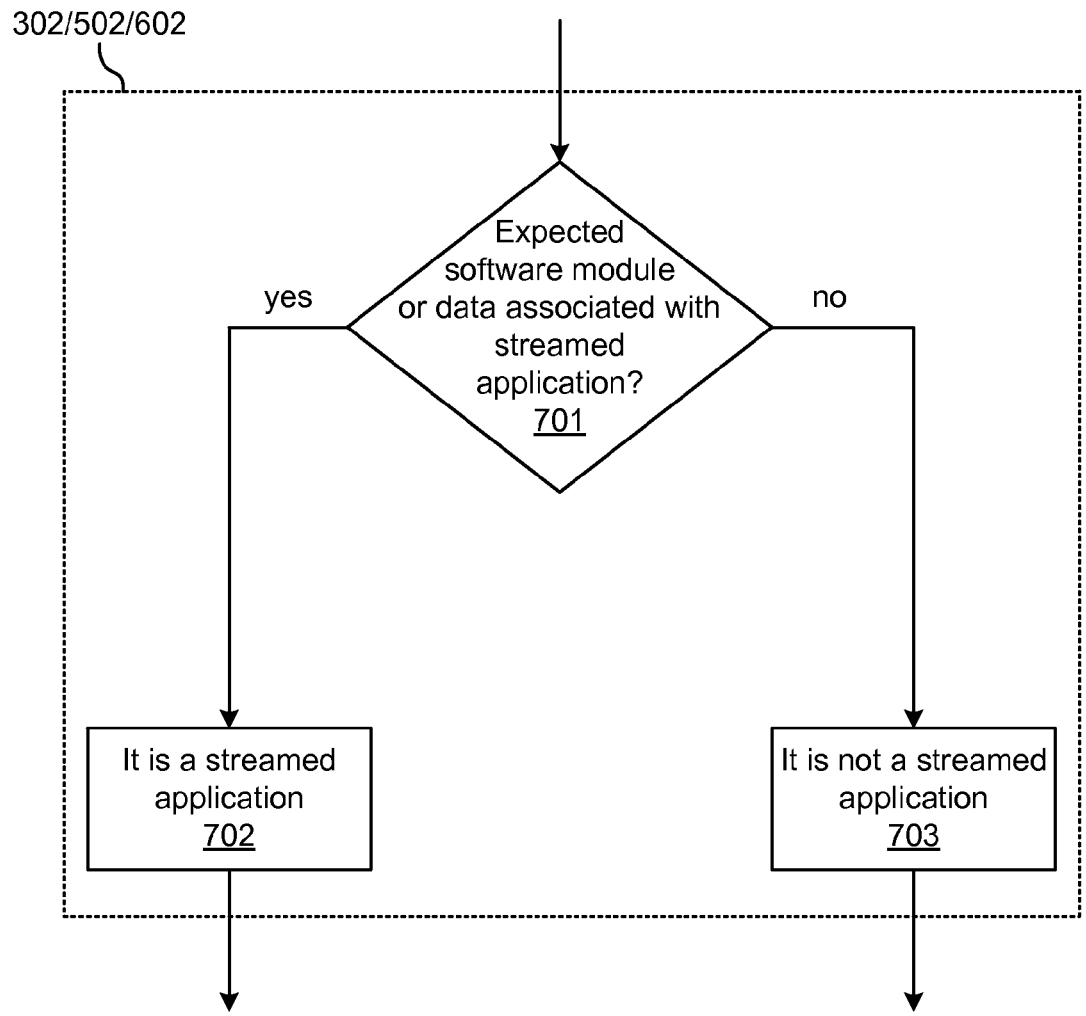
FIG. 7 is a flow chart showing an example method of determining whether a currently-executing application is a streamed application or a non-streamed application.

Once the cut or copy command is detected, at step 302, the software hook may determine whether the cut or copy command is to cut or copy content displayed by a streamed application. As previously discussed, this determination may be made based on any of a variety of factors. For instance, as shown by way of example in FIG. 7, step 302 may involve sub-steps 701, 702, and 703. At step 701, the software hook may determine whether an expected software or data module (e.g., the radehook.dll library, in the case of Citrix Receiver® streamed applications) associated with streamed applications is being used or is otherwise active. If so, then at step 702, the software hook determines that the application is in fact a streamed application. If not, then at step 703, the software hook determines that the application is not a streamed application. Of course, FIG. 7 is merely an example, and the software hook may perform step 302 to determine whether the application is a streamed application in any way desired.

Figure 8:
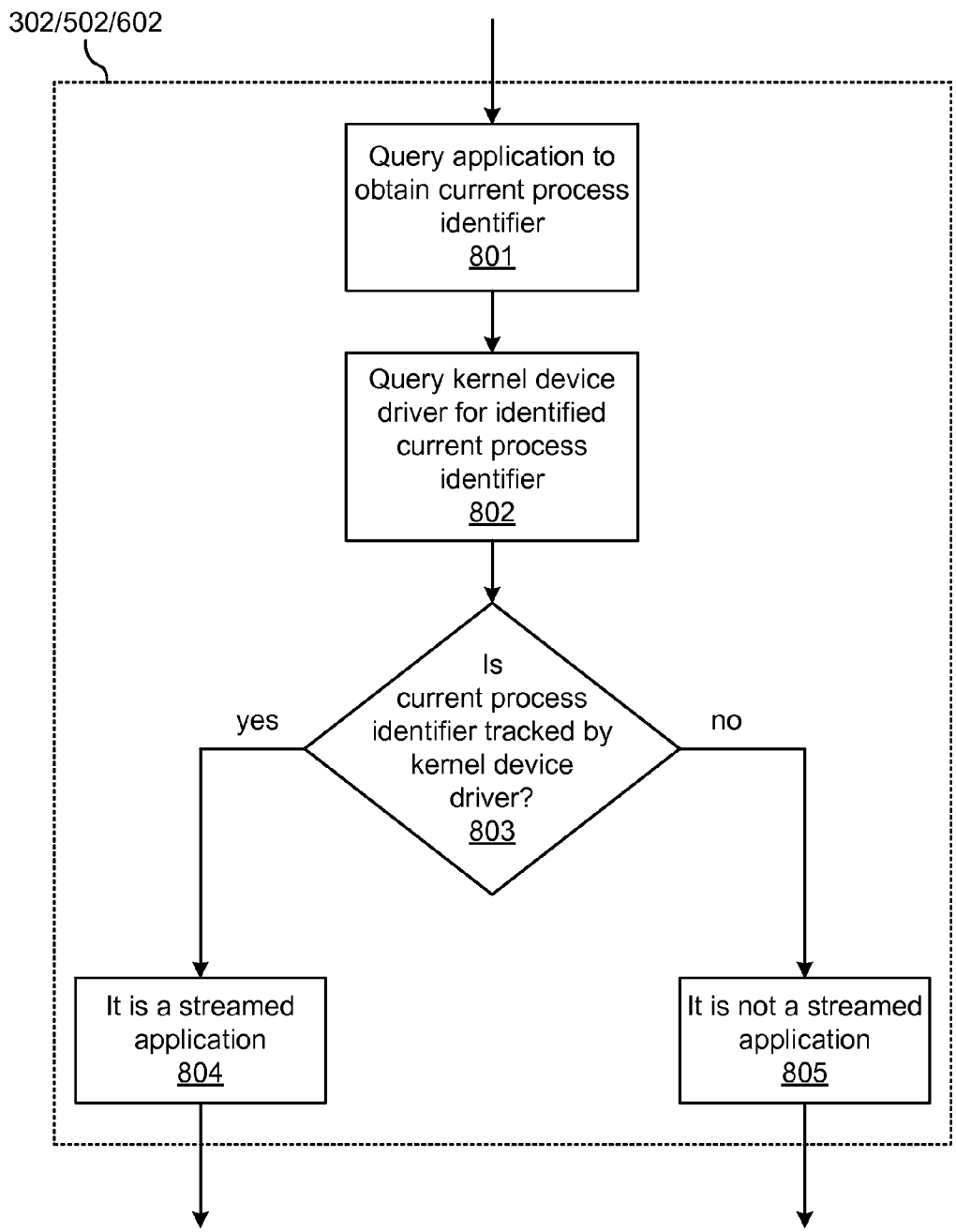
FIG. 8 is a flow chart showing another example method of determining whether a currently-executing application is a streamed application or a non-streamed application

Another example of how the software hook may determine whether an application is streamed or non-streamed is shown in the flow chart of FIG. 8. In this example, at step 801, the software hook may query the application to obtain the current process identifier associated with that application. Then, at step 802, the software hook may query the kernel device driver to determine whether the current process identifier identified by the application is one that is also being tracked by the kernel device driver. If at step 803 it is determined by the software hook that there is a match, then the application would be considered a streamed application at step 804. If not, then the application would be considered a non-streamed application at step 805. Again, FIG. 8 is merely an example, and the software hook may perform step 302 to determine whether the application is a streamed application in any way desired.

Returning to FIG. 3, if the application is not determined to be a streamed application, then the process may move to step 303, at which point a global variable (e.g., a flag) may be set to a value indicating that the content being cut or copied is sourced from a non-streamed application. For example, the value of the global variable representing this state may be the value zero. The process may then move to step 307, in which the software hook may return control of the attempted copy or cut to the operating system, so that the content may be copied or cut and placed on the clipboard or other storage region in the usual manner. As will be described later, the global variable may be later used during an attempted paste operation to determine whether the content in the clipboard is allowed to be pasted in a particular context.

If the application is determined to be a streamed application, then the process may move to step 304, in which the software hook may determine whether a pre-existing policy allows for the content to be cut or copied. The policy may include one or more rules indicating whether the content may be cut or copied depending upon, e.g., which streamed application is providing the source content to be cut or copied, the identity of the user currently attempting the cutting or copying (or currently logged in to the client device), the identity of the physical computer acting as the client device, the time of day, the date, the location of the client device, and/or the type of source content (e.g., text, graphics, etc.).

For instance, according to the policy, a first user may be allowed to copy content from a streamed application, but a second user may not. Or, the policy may allow content to be copied from a streamed version of Microsoft Word®, but not from a streamed version of the Microsoft PowerPoint® application. The policy may include one or more rules that may be combined, such as with Boolean combiners (e.g., the policy might include the following: content may be copied or cut IF the user is "user 1" AND if the streamed application is NOT the Microsoft PowerPoint® application). The policy may be stored as data locally at the client device and/or at the server.

If policy allows the source content to be cut or copied, then the process may move to step 305, at which point the global variable may be set to a value indicating that the content being cut or copied is sourced from a streamed application. For example, the value of the global variable representing this state may be the value one. Of course, such values may be reversed, and in any event these values are merely examples. Where multiple applications are streamed simultaneously to (executing simultaneously on) the same client device, the hook may be loaded into each of the applications, and each of the instances of the hook may be able to share and update the value of the global variable. Thus, when a copy or cut operation from a source application is successfully made, the global variable may be updated in steps 303 and 305 in accordance with whether that source application is a streamed application.

The process may then move to step 307, to allow the operating system to complete the cut or copy operation and place a copy of the source content into the clipboard or other storage region. If policy does not allow the source content to be cut or copied, then the process may move from step 304 to step 306, in which the software hook may block the operating system from completing the cut or copy operation. For instance, the software hook may return control to the operating system in such a manner that the operating system has no knowledge that a cut or copy operation was requested (e.g., by setting the value of some operating system or application variable).

Figure 4:
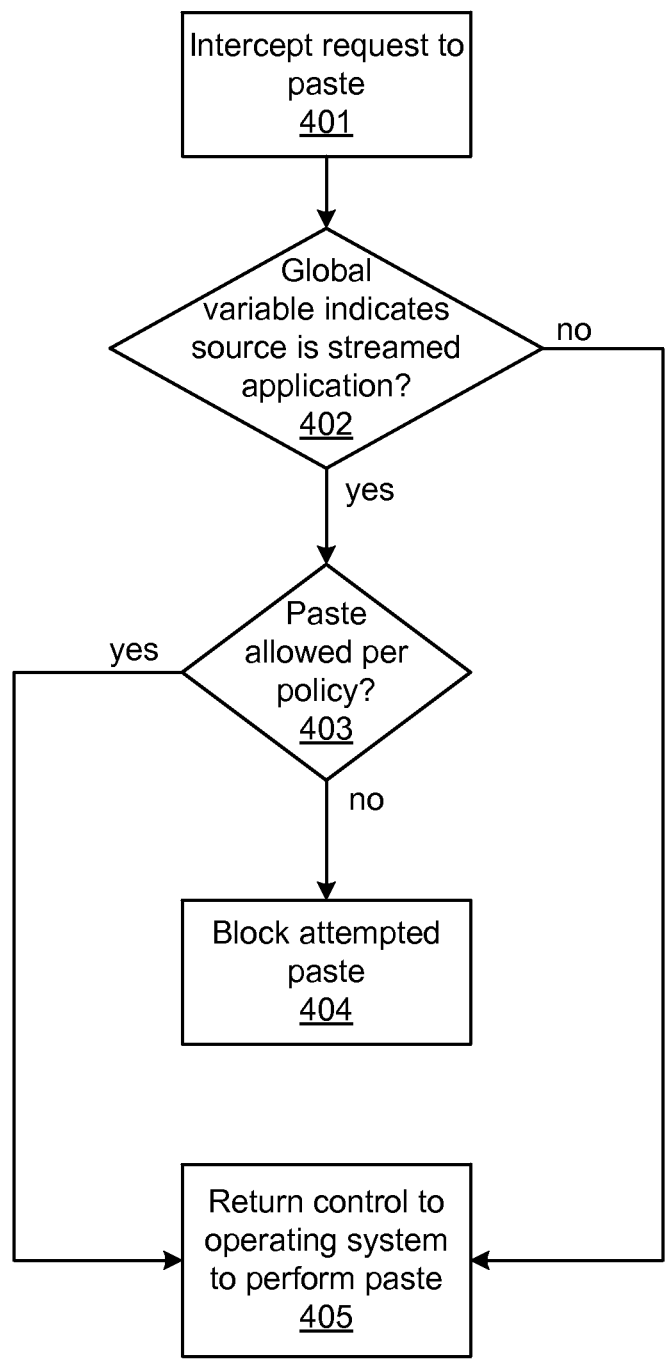
FIG. 4 is a flow chart showing an example method of controlling whether a paste command on the client device may be successfully performed.

FIG. 4 is a flow chart showing an example method of controlling whether a paste command on the client device may be successfully performed. At step 401, the same or a different software hook running on the client device may intercept a request to paste content from the clipboard or other storage region. Again, the software hook may be or otherwise include a routine that continuously operates in the background, looking for a paste command.

Once the paste command is detected, at step 402, the software hook may determine whether the content stored in the clipboard or other storage region was sourced from a streamed application. In the present example, this may be accomplished by examining the value of the global variable that may have been previously set in step 303 or step 305. If the value of the global variable application indicates that the content was not sourced from a streamed application, then the process may move to step 405, at which point the software hook may return control of the attempted paste to the operating system, so that the content may be pasted in the usual manner.

If the value of the global variable application indicates that the content was sourced from a streamed application, then the process may move to step 403, in which the software hook may determine whether the pre-existing policy allows for the content to be pasted. Again, the policy may include one or more rules indicating whether the content may be cut or copied depending upon, e.g., which streamed application is providing the source content to be pasted, the identity of the user currently attempting the pasting (or currently logged in to the client device), the identity of the physical computer acting as the client device, the time of day, the date, the location of the client device, and/or the type of source content (e.g., text, graphics, etc.).

For instance, according to the policy, a first user may be allowed to paste content from a streamed application, but a second user may not. Or, the policy may allow content to be pasted from a streamed version of Microsoft Word®, but not from a streamed version of the Microsoft PowerPoint® application. For instance, the policy might include the following: content may be pasted IF the user is "user 1" AND if the streamed application is NOT the Microsoft PowerPoint® application.

If policy allows the content in the clipboard or other storage region to be pasted, then the process may move to step 405, so as to allow the operating system to complete the paste operation in the usual manner.

If policy does not allow the content to be pasted, then the process may move from step 403 to step 404, in which the software hook may block the operating system from completing the paste operation. For instance, the software hook may return control to the operating system in such a manner that the operating system has no knowledge that a paste operation was requested (e.g., by setting the value of some operating system or application variable).

Figure 5:
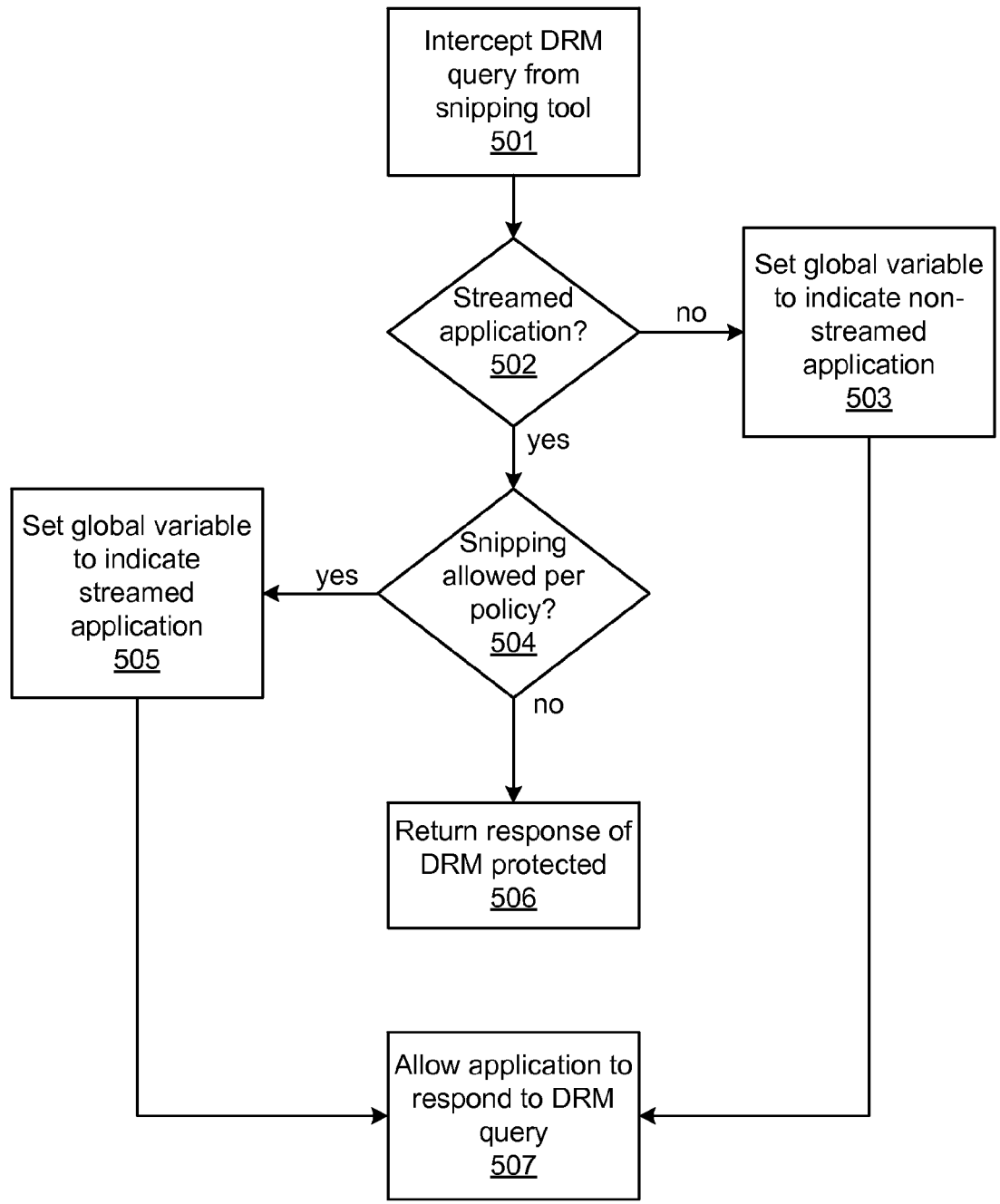
FIG. 5 is a flow chart showing an example method of controlling whether a snipping tool on the client device may be successfully used to obtain a copy of source content.

FIG. 5 is a flow chart showing an example method of controlling whether a snipping tool on the client device may be successfully used to obtain a copy of source content. At step 501, the same or a different software hook running on the client device may intercept a request to use the snipping tool to obtain the copy of the content. Again, the software hook may be or otherwise include a routine that continuously operates in the background, looking for an appropriate snipping tool command.

Once the snipping tool command is detected, at step 502, the software hook may determine whether the snipping tool command is to copy content displayed by a streamed application. As previously discussed, this determination may be made based on any of a variety of factors. For instance, step 502 may be performed as shown in FIG. 7 or FIG. 8.

If the application is not determined at step 502 to be a streamed application, then the process may move to step 503, at which point the global variable may be set to the value indicating that the content being copied is sourced from a non-streamed application (to allow the paste intercept of routine of, e.g., FIG. 4, to determine whether the copied content was sourced from a streamed application). The process may then move to step 507, in which the software hook may return control of the attempted snipping tool command to the operating system, so that the content may be copied and placed on the clipboard or other storage region in the usual manner, in accordance with the operation of the snipping tool.

If the application is determined at step 502 to be a streamed application, then the process may move to step 504, in which the software hook may determine whether the policy allows for the content to be copied by the snipping tool. Again, the policy may include one or more rules indicating whether the content may be copied by the snipping tool depending upon, e.g., which streamed application is providing the source content to be copied, the identity of the user currently attempting the copying (or currently logged in to the client device), the identity of the physical computer acting as the client device, the time of day, the date, the location of the client device, and/or the type of source content (e.g., text, graphics, etc.).

For instance, according to the policy, a first user may be allowed to use the snipping tool to copy content from a streamed application, but a second user may not. Or, the policy may allow content to be copied by the snipping tool from a streamed version of Microsoft Word®, but not from a streamed version of the Microsoft PowerPoint® application. The policy may include one or more rules that may be combined, such as with Boolean combiners (e.g., the policy might include the following: content may be copied by the snipping tool IF the user is "user 1" AND if the streamed application is NOT the Microsoft PowerPoint® application).

If policy allows the source content to be copied using the snipping tool, then the process may move to step 505, at which point the global variable may be set to the value indicating that the content being copied is sourced from a streamed application. As previously mentioned, where multiple applications are streamed simultaneously to (executing simultaneously on) the same client device, the hook may be loaded into each of the applications, and each of the instances of the hook may be able to share and update the value of the global variable. Thus, when a snipping tool operation from a source application is successfully performed, the global variable may be updated in steps 503 and 505 in accordance with whether that source application is a streamed application.

The process may then move to step 507, to allow the operating system to complete the snipping tool operation. If policy does not allow the source content to be copied by the snipping tool, then the process may move from step 504 to step 506, in which the software hook may perform some function designed to prevent the snipping tool from copying the content. For example, in versions of Microsoft Windows® operating system, the snipping tool is already configured to check whether the content from the source application window is protected by digital management rights (DRM). Normally, the snipping tool requests the DRM status from the source application, and traditionally the source application returns information indicating whether the content being displayed is DRM protected. In this example, the software hook may leverage the existing DRM-checking functionality by intercepting the DRM status request from the snipping tool and returning a response indicating that the source content is DRM protected (regardless of whether the content is actually DRM protected). Thus, the software hook may pretend to be the application to which the DRM status request was directed. This may be done by, e.g., hooking the DRMIsWindowProtected function of the MSDRM library of the Microsoft Windows® operating system.

In response to the software hook indicating that the content is DRM-protected, the snipping tool would automatically refuse to copy the requested source content. In the case of the application being a non-streamed application, at step 507, the software hook may allow the application (streamed or non-streamed) to respond to the DRM status request on its own, in accordance with whether the source content is actually DRM-protected.

Figure 6:
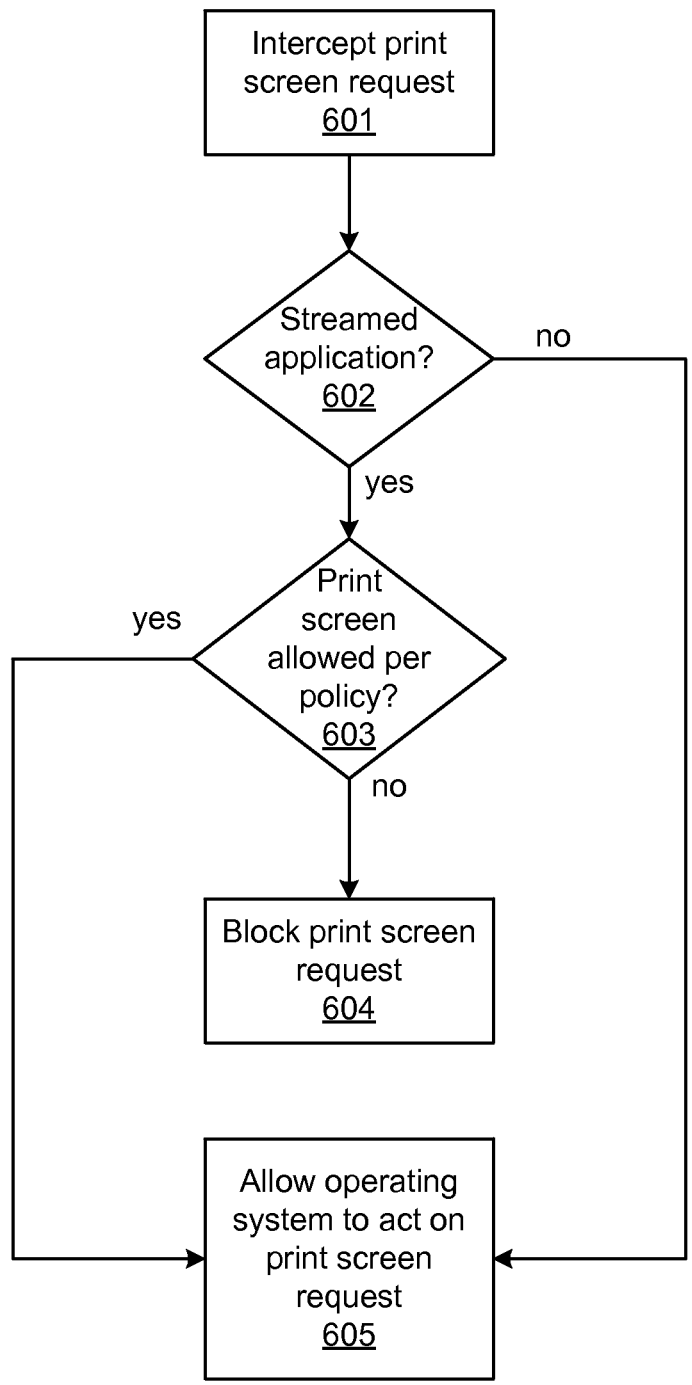
FIG. 6 is a flow chart showing an example method of controlling whether a print screen command on the client device may be successfully performed.

FIG. 6 is a flow chart showing an example method of controlling whether a print screen command on the client device may be successfully performed. At step 601, the same or a different software hook running on the client device may intercept a print screen request. This may be done by, e.g., looking for an indication that the "print screen" button or function was selected by the keyboard, or from a menu selection. For instance, where the operating system is one of the versions of the Microsoft Windows® family of operating systems, the software hook may be or otherwise include a low-level software hook that looks for when the key code of VK_SNAPSHOT has been selected. Again, the software hook may be or otherwise include a routine that continuously operates in the background, looking for an appropriate print screen command.

Once the print screen command is detected, at step 602, the software hook may determine whether the display includes content displayed by a streamed application. As previously discussed, this determination may be made based on any of a variety of factors. For instance, step 602 may be performed as shown in FIG. 7 or FIG. 8.

If it is determined at step 602 that the screen does not include content from a streamed application, then the process may move to step 605, in which the software hook may return control of the attempted print screen command to the operating system, so that the screen may be printed in the usual manner.

If it is determined at step 602 that the screen includes content from a streamed application, then the process may move to step 603, in which the software hook may determine whether the policy allows for the content to be printed using the print screen command. Again, the policy may include one or more rules indicating whether the content may be printed using the print screen command depending upon, e.g., which streamed application is providing the source content to be printed, the identity of the user currently attempting the print screen command (or currently logged in to the client device), the identity of the physical computer acting as the client device, the time of day, the date, the location of the client device, and/or the type of source content (e.g., text, graphics, etc.).

For instance, according to the policy, a first user may be allowed to use the print screen command to print a screen containing content from a streamed application, but a second user may not. Or, the policy may allow use of the print screen command to print a screen containing content from a streamed version of Microsoft Word®, but not from a streamed version of the Microsoft PowerPoint® application. The policy may include one or more rules that may be combined, such as with Boolean combiners (e.g., the policy might include the following: the screen may be printed using the print screen command IF the user is "user 1" AND if the screen does NOT contain content from a streamed Microsoft PowerPoint® application).

If policy allows the source content to be printed using the print screen command, then the process may move to step 605, to allow the operating system to complete the print screen operation.

If policy does not allow the source content to be printed using the print screen command, then the process may move from step 504 to 605, in which the software hook may prevent the print screen command from being acted upon. For instance, the software hook may return control to the operating system in such a manner that the operating system has no knowledge that a print screen operation was requested (e.g., by setting the value of some operating system or application variable).

While various example embodiments have been illustrated and described herein, it is not intended that these embodiments illustrate and describe all possible aspects. Rather, the words used in the specification are words of description rather than limitation, and it is understood that various changes may be made without departing from the spirit and scope of the present disclosure.

Moreover, variations on the disclosed embodiments are envisioned. For example, while operating systems such as the Microsoft Windows® family of operating systems have been referred to in various embodiments, these embodiments may also be used in conjunction with other types of operating systems. Also, while various examples of policy rules have been disclosed, other policy rules are possible. For instance, a cut/copy/paste/snip/print-screen policy may additionally or alternatively be provided for determining whether these operations may be successfully completed in connection with content from non-streamed software application. Moreover, any of the policy rules, such as those listed in connection with the various disclosed embodiments, may be combined into a single policy as desired.

The invention claimed is:

1. A method, comprising:
   detecting, by a computing device, a request to obtain a copy of content displayed by a software application that is being executed by the computing device;
   determining, by the computing device, whether the software application is a software application that is streamed to the computing device from a source external to the computing device during local execution of the software application on the computing device;
   setting a global variable to contain either a first value responsive to the software application being determined to be a software application that is streamed or a second value responsive to the software application being determined to be a non-streamed software application; and
   selectively either pasting or not pasting, by the computing device in response to a request to paste, the content depending upon whether the global variable contains the first value or the second value.

2. The method of claim 1, wherein:
   the setting comprises setting the global variable to contain the first value; and
   the selectively either pasting or not pasting comprises preventing pasting, by the computing device, of the content responsive to determining that the global variable contains the first value.

3. The method of claim 1, further comprising:
   responsive to determining that the software application is a software application that is streamed to the computing device from a source external to the computing device during local execution of the software application on the computing device, determining whether a policy allows the content displayed by the software application to be copied,
   wherein the setting the global variable comprises setting the global variable to contain the second value responsive to both determining that the software application is a software application that is streamed and determining that the policy allows the content displayed by the software application to be copied.

4. The method of claim 1, wherein the request to obtain the copy comprises a command selected from one of the following: a copy command, a print screen command, and a snipping tool command.

5. The method of claim 1, wherein said determining whether the software application is a software application comprises determining whether a predetermined software or data component is active.

6. A method, comprising:
   intercepting, by a computing device, a request directed to a software application for digital rights management (DRM) status of content displayed by the software application that is executing on the computing device;
   determining, by the computing device, whether the software application is a software application that is streamed to the computing device from a source external to the computing device during local execution of the software application on the computing device;
   setting a global variable to contain either a first value responsive to the software application being determined to be a software application that is streamed or a second value responsive to the software application being determined to be a non-streamed software application; and
   depending upon whether the software application is determined to be a software application that is streamed to the computing device from a source external to the computing device during local execution of the software application on the computing device, either (1) allowing the software application to respond to the request with a DRM status of the content, or (2) responding to the request that the content is DRM protected.

7. The method of claim 6, further comprising:
   selectively either copying or not copying the content depending upon whether the response to the request for DRM status indicates that the content is DRM protected.

8. The method of claim 6, further comprising:
   responsive to determining that the software application is a software application that is streamed to the computing device from a source external to the computing device during local execution of the software application on the computing device, determining whether a policy allows the content displayed by the software application to be copied; and
   responsive to the policy allowing the content to be copied, allowing the software application to respond to the request with the DRM status of the content.

9. A non-transitory computer-readable medium storing computer-executable instructions for performing steps, the steps comprising:
   intercepting, by a computing device, a request directed to an operating system of the computing device to obtain a copy of content displayed by a software application that is executing on the computing device;
   determining whether the software application is a software application that is streamed to the computing device from a source external to the computing device during local execution of the software application on the computing device;
   setting a global variable to contain either a first value responsive to the software application being determined to be a software application that is streamed or a second value responsive to the software application being determined to be a non-streamed software application; and
   selectively either allowing the operating system to perform a paste operation or preventing the paste operation, depending upon whether the global variable contains the first value or the second value.

10. The non-transitory computer-readable medium of claim 9, wherein:
   the setting comprises setting the global variable to contain the first value; and
   the selectively either allowing the operating system to perform the paste operation or preventing the paste operation comprises preventing the paste operation responsive to determining that the global variable contains the first value.

11. The non-transitory computer-readable medium of claim 9, wherein the steps further comprise:
   responsive to determining that the software application is a software application that is streamed to the computing device from a source external to the computing device during local execution of the software application on the computing device, determining whether a policy allows the content displayed by the software application to be copied,
   wherein the setting the global variable comprises setting the global variable to contain the second value responsive to both determining that the software application is a software application that is streamed and determining that the policy allows the content displayed by the software application to be copied.

12. The non-transitory computer-readable medium of claim 9, wherein the request comprises a command selected from one of the following: a copy command, a print screen command, and a snipping tool command.

13. The non-transitory computer-readable medium of claim 9, wherein said determining whether the software application is a software application that is streamed comprises:
   determining, based on the software application, a particular executable component different from the software application; and
   determining whether the particular executable component is being locally executed by the computing device.

14. A method, comprising:
   detecting, by a computing device, a request to copy content that is displayed on a display of the computing device by a software application that is being locally executed by the computing device;
   determining, by the computing device, whether the software application being executed by the computing device is streamed to the computing device from a source external to the computing device during local execution of the software application on the computing device;
   setting a global variable to contain either a first value responsive to the software application being determined to be a software application that is streamed or a second value responsive to the software application being determined to be a non-streamed software application; and
   preventing, by the computing device, pasting of the content responsive to determining that the global variable contains the first value.

15. The method of claim 14, wherein the request comprises a command selected from one of the following: a copy command, a print screen command, and a snipping tool command.

16. The method of claim 14, wherein the determining whether the software application being executed by the computing device is being streamed to the computing device, from the source external to the computing device, during the local execution of the software application on the computing device comprises:
   determining, based on the software application, a particular executable component different from the software application; and
   determining whether the particular executable component is being locally executed by the computing device.

* * * * *